United States Patent [19]

Kondo et al.

[11] Patent Number: 4,628,670

[45] Date of Patent: Dec. 16, 1986

[54] APPARATUS FOR PROCESSING TUBE FOR PACKAGE CONTAINERS

[75] Inventors: Yoshihito Kondo, Tokushima; Shigeru Wakabayashi, Naruto; Fumiyuki Iwano; Kiyomi Yoshida, both of Tokushima, all of Japan

[73] Assignee: Shikoku Kakooki Co., Ltd., Tokushima, Japan

[21] Appl. No.: 781,857

[22] Filed: Sep. 30, 1985

[30] Foreign Application Priority Data

Oct. 12, 1984 [JP] Japan .................... 59-214795
Oct. 12, 1984 [JP] Japan .................... 59-214796
Oct. 12, 1984 [JP] Japan .................... 59-214797

[51] Int. Cl.⁴ .................................... B65B 9/08
[52] U.S. Cl. ............................ 53/551; 53/373
[58] Field of Search .......... 53/551, 552, 373, 451, 53/554, 555

[56] References Cited

U.S. PATENT DOCUMENTS

| | | | |
|---|---|---|---|
| 2,837,883 | 6/1958 | Bracey | 53/552 |
| 2,869,298 | 1/1959 | Zwoyer | 53/552 X |
| 3,050,916 | 8/1962 | Gausman et al. | 53/552 |
| 3,449,888 | 6/1969 | Gausman | 53/552 |
| 3,589,913 | 6/1971 | Rosenberg | 53/552 X |

Primary Examiner—Horace M. Culver
Attorney, Agent, or Firm—Armstrong, Nikaido, Marmelstein & Kubovcik

[57] ABSTRACT

A package container tube processing apparatus by which a vertical tube filled with contents is divided into lengths each corresponding to one container to form intermediate containers. The apparatus comprises a vertical rod movable upward and downward and reversibly rotatable, a movable frame attached to the vertical rod and movable therewith upward and downward while permitting the reversible rotation of the vertical rod, a pair of pressure arms supported at their lower portions by the movable frame so as to be pivotally movable about a pair of horizontal axes parallel to each other, a pair of seal bars fixed to the upper portions of the pressure arms respectively and opposed to each other, and conversion means for converting the forward-reverse rotation of the vertical rod to a pivotal motion of the two pressure arms to move the two seal bars toward or away from each other.

7 Claims, 15 Drawing Figures

APPARATUS FOR PROCESSING TUBE FOR PACKAGE CONTAINERS

The present invention relates to an apparatus for processing a tube for package containers for use in a packaging machine of the type wherein a web serving as a packaging material is finally shaped into rectangular parallelepipedal containers, the apparatus being so adapted that a tube formed from the web and filled with fluid food or like contents is divided into lengths each corresponding to one container to obtain intermediate containers.

As disclosed, for example, in Examined Japanese Utility Model Publication No. 43427/1977, conventional apparatus of this type comprise an upwardly or downwardly movable frame, a pair of pressure arms supported at their lower portions by the movable frame so as to be pivotally movable about a pair of horizontal axes parallel to each other, a pair of seal bars fixed to the upper portions of the pressure arms respectively and opposed to each other, means for pivotally moving the two pressure arms between a closed position where the two seal bars are close to each other and an open position where the two seal bars are away from each other, press means for producing a sealing pressure between the two seal bars by forcing the two pressure arms toward each other at the closed position, and lift means for moving the movable frame upward and downward at a stroke corresponding to the length of one container. However, such apparatus have the following problem. The above-mentioned means, each comprising complex link mechanism and lever mechanism, are designed to move upward and downward along with the movable frame, so that the movable components constitute a substantial portion of the overall apparatus and therefore require a large space and much labor for adjustment.

An object of the present invention is to overcome the above problem of the conventional apparatus and to provide a package container tube processing apparatus comprising movable components which are compacted to the greatest possible extent and having a simple construction.

Generally with packaging machines, containers of different heights are formed to change the quantity of contents according to the height. For this purpose, the vertical stroke length of the movable frame of the above apparatus needs to be altered.

Another object of the present invention is to provide a package container tube processing apparatus in which the stroke length of the movable frame is variable quickly with ease.

The present invention provides an apparatus for processing a tube for package containers which comprises a vertical rod movable upward and downward and reversibly rotatable, a movable frame attached to the vertical rod and movable therewith upward and downward while permitting the reversible rotation of the vertical rod, a pair of pressure arms supported at their lower portions by the movable frame so as to be pivotally movable about a pair of horizontal axes parallel to each other, a pair of seal bars fixed to the upper portions of the pressure arms respectively and opposed to each other, and conversion means for converting the forward-reverse rotation of the vertical rod to a pivotal motion of the two pressure arms to move the two seal bars toward or away from each other, whereby the first object of the invention can be filfilled.

According to another feature of the present invention there is provided an apparatus for processing a tube for package containers which comprises an upwardly and downwardly movable frame, a pair of pressure arms supported at their lower portions by the movable frame so as to be pivotally movable about a pair of horizontal axes parallel to each other, a pair of seal bars fixed to the upper portions of the pressure arms respectively and opposed to each other, means for pivotally moving the two pressure arms between a closed position where the two seal bars are close to each other and an open position where the two seal bars are away from each other, and press means for producing a sealing pressure between the two seal bars by forcing the two pressure arms toward each other at the closed position, the press means including a stationary engaging member having an upwardly open engaging recess and provided on one of the pressure arms so as to project into a space between the two pressure arms, a movable engaging member having a downward engaging projection engageable in the recess and a hydraulic cylinder having the movable engaging member attached to its piston rod, the hydraulic cylinder being supported by the other pressure arm and being rotatable about an axis parallel to the center of pivotal movement of said other pressure arm. Thus, the first object of the present invention can be fulfilled by the apparatus of this feature as well as by the apparatus of the first feature.

According to another feature of the present invention, there is provided an apparatus for processing a tube for package containers which comprises an upwardly and downwardly movable frame, a pair of pressure arms supported at their lower portions by the movable frame so as to be pivotally movable about a pair of horizontal axes parallel to each other, a pair of seal bars fixed to the upper portions of the pressure arms respectively and opposed to each other, and lift means for moving the movable frame upward and downward at a stroke length which is variable so as to form intermediate containers of varying lengths to give the containers different capacities, the lift means including a plurality of plate cams fixedly arranged on a horizontal cam shaft at positions different longitudinally thereof and different in cam contour in corresponding relation to the variations in the stroke length of the movable frame, and a cam follower connected to the movable frame and common to all the plate cams, the cam follower having a roller movable in parallel to the cam shaft so as to contact the contour face of each of the cams individually.

Merely by way of exmaple, an embodiment of the present invention will be described below with reference to the accompanying drawings, in which:

FIG. 4 is a view showing the same as it is seen in the direction of arrows IV—IV in FIG. 3a;

FIG. 5 is a view taken along the line V—V in FIG. 3a;

Figure 1:
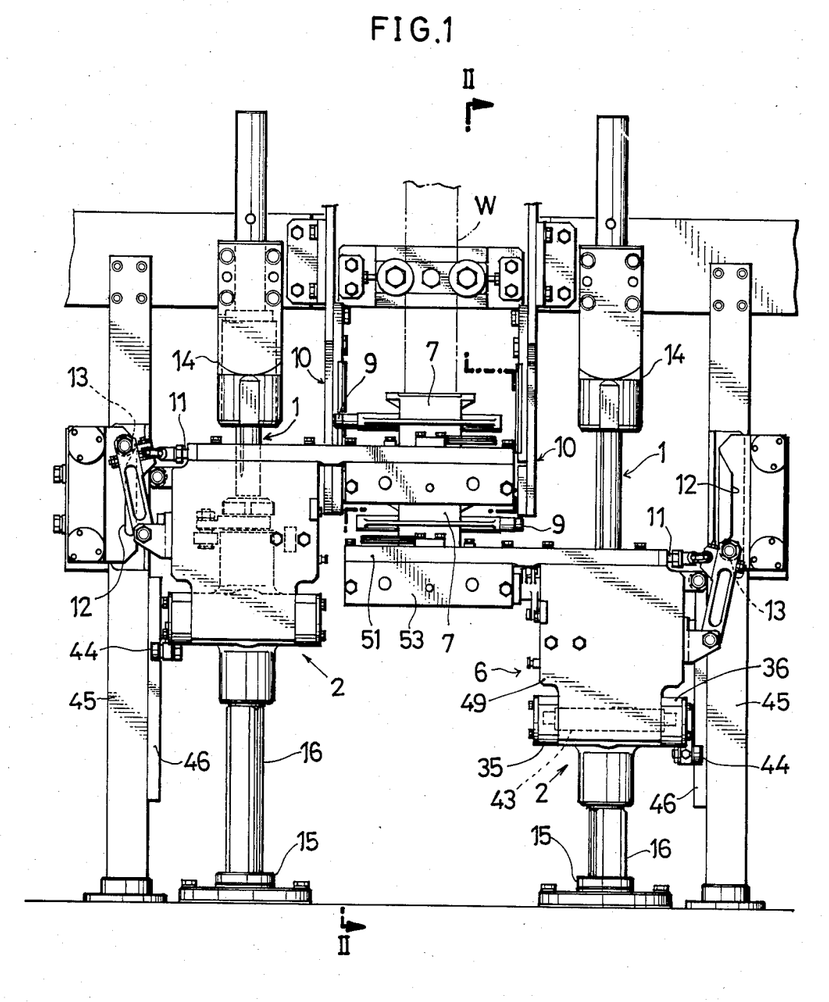
FIG. 1 is a front view of the embodiment.
Figure 2:
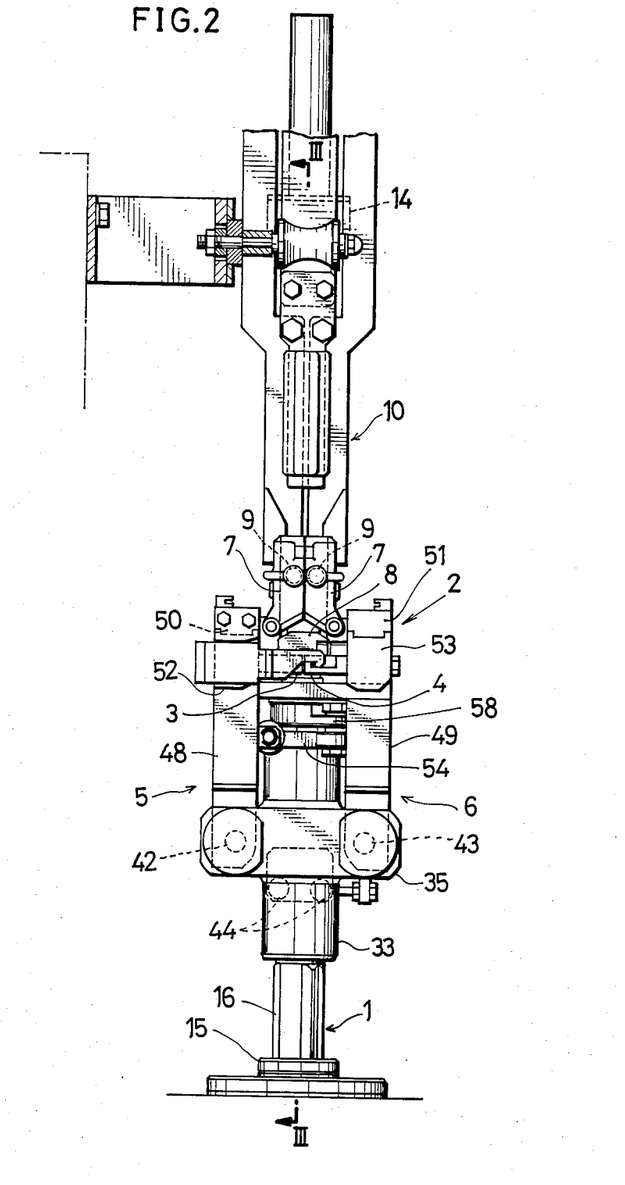
FIG. 2 is a view in section taken along the line II—II in FIG. 1.

With reference to FIGS. 1 and 2 showing an apparatus for processing a tube W for package containers, the apparatus comprises a left half unit and a right half unit which are identical in construction but are oriented in different directions. Each unit comprises a vertical rod 1 movable upward and downward and reversibly rotatable, a movable frame 2 attached to the vertical rod 1 and movable therewith upward and downward while permitting the reversible rotation of the vertical rod 1, a pair of pressure arms 5, 6 supported at their lower portions by the movable frame 2 so as to be pivotally movable about a pair of horizontal axes parallel to each other, a pair of seal bars 3, 4 fixed to the upper portions of the pressure arms 5, 6 respectively and opposed to each other.

Although not shown, one of the seal bars 3, 4 has embedded therein a heater for heat sealing, and the other seal bar is provided with a cutter.

The two movable frame 2 are moved vertically alternately in different directions in synchronism at a specified stroke. Thus, when one movable frame 2 ascends, the other movable frame 2 descends. Then the movable frame 2 is at the upper limit position of its stroke, the two seal bars 3, 4 move toward each other to a closed position, whereby the tube W is transversely pressed over a predetermined width for sealing. The seal bars 3, 4 in pressing contact with the tube W descend with the movable frame 2, whereby the tube W is advanced a distance corresponding to the length of one container. Upon the movable frame 2 reaching its lower limit position, the cutter operates, cutting the tube W at the middle of the seal width, whereupon the seal bars 3, 4 open to release the tube W. Thus, the leading end portion of the tube W corresponding to one container is separated from the remaining tube portion.

Although not shown in detail, disposed above the seal bars 3, 4 are a pair of divided front and rear movable pressing dies 7 which are in the form of a rectangular tube when combined, and a pair of right and left movable ear forming pieces 8. Each movable pressing die 7 has a roller 9. When moving along a cam 10, these rollers 9 pivotally move the dies 7 away from each other about their lower ends. When combined together, the movable pressing dies 7 define a shape in conformity with the external shape of the box-like container to be finally obtained. When combined together in pressing contact with the tube W, the dies 7 form a flat tube end and give a rectangular cross section to the tube W for shaping the box-like container. At the same time, a quantity of contents is measured out. The movable ear forming pieces 8 are generally L-shaped in cross section and are pivotally movable about their lower ends in directions opposite to each other by a horizontally movable bar 11 mounted on the upper portions of the pressure arms 5, 6 and unillustrated racks and pinions. The bar 11 has a projecting end which is connected to a cam 12 and a follower 13 for moving the bar. The ear forming pieces 8 cooperate with the pressing dies 7 to form a projecting triangular ear at the flat tube end.

Figure 3A:
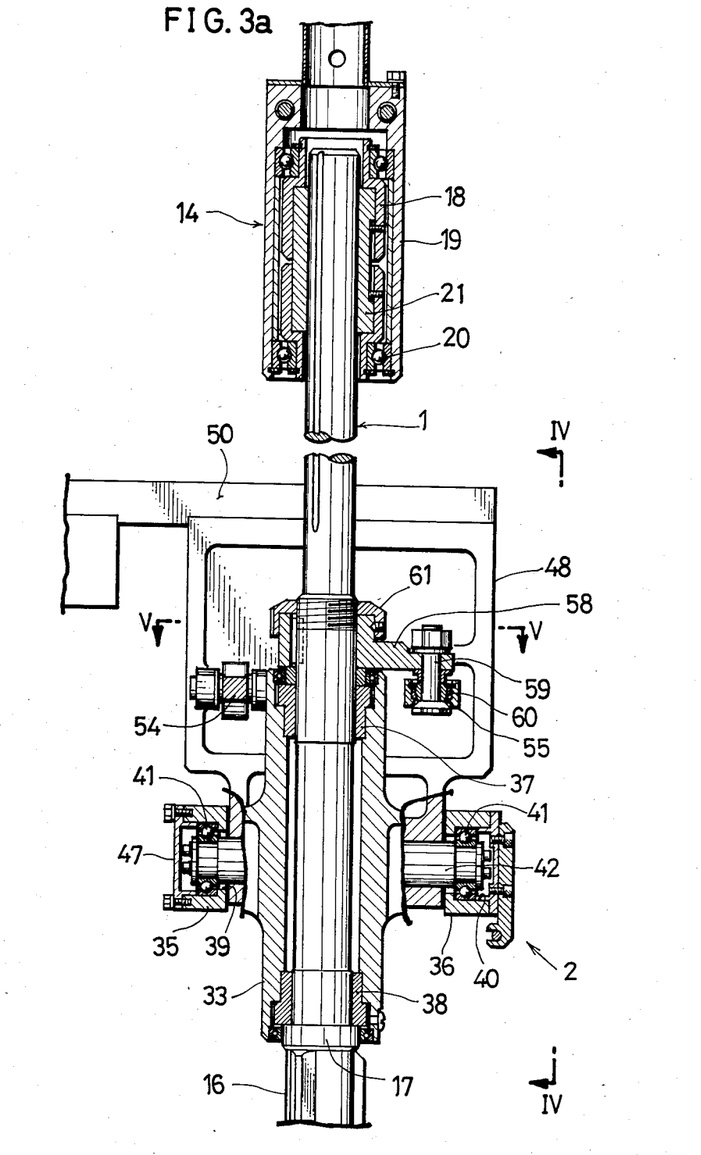
FIGS. 3a and 3b are enlarged views in section taken along the line III—III in FIG. 2.
Figure 3B:
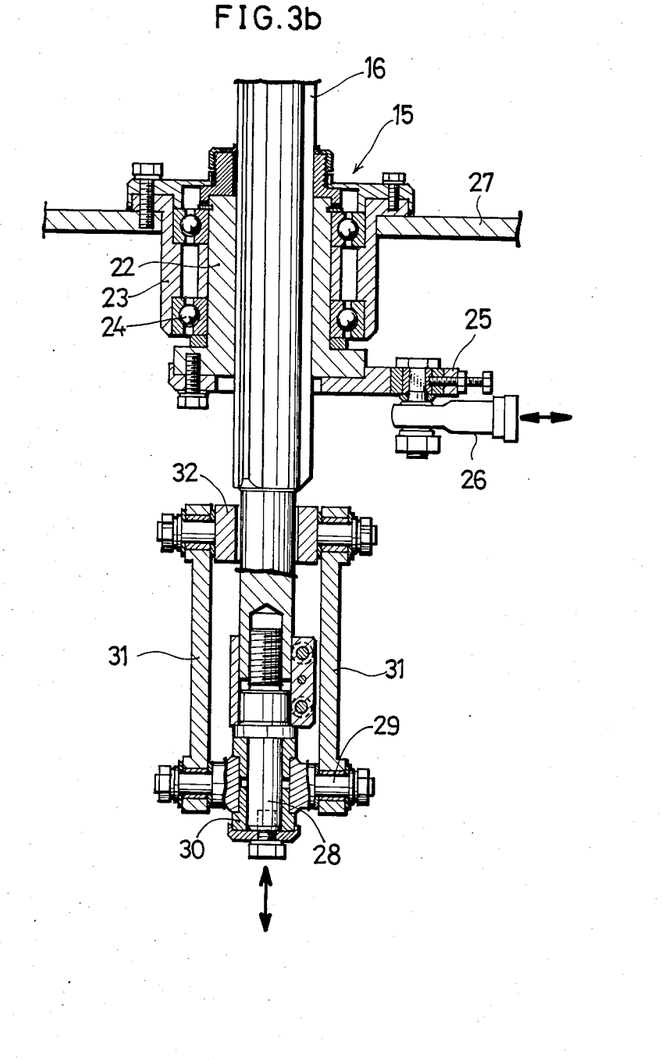
Figure 4:
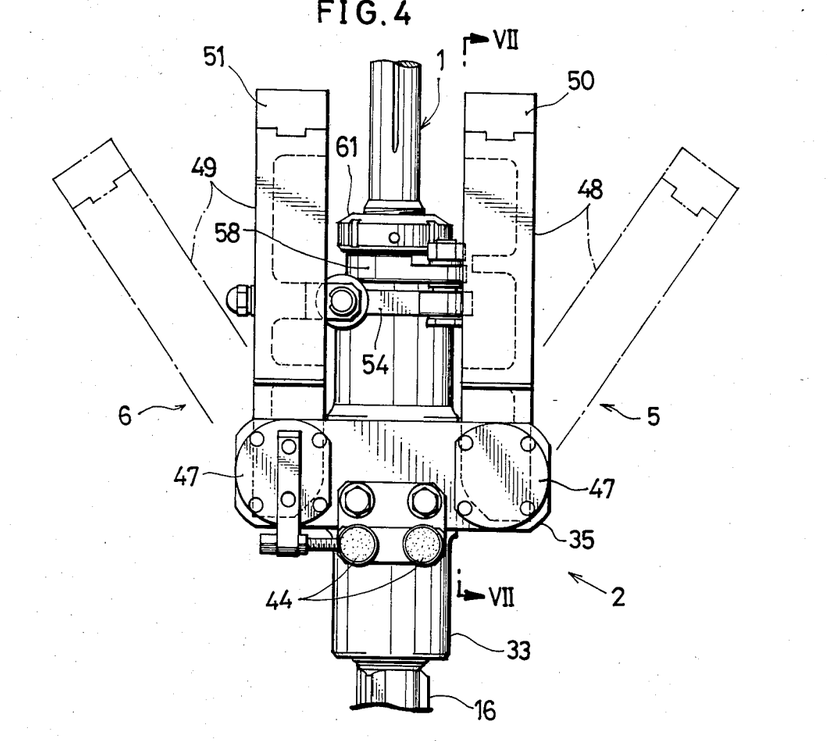
Figure 5:
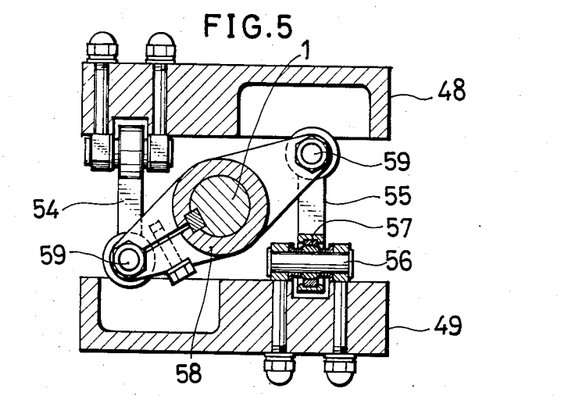

As shown in detail in FIGS. 3a and 3b, the vertical rod 1 is rotatably and vertically movably supported by upper and lower two bearing members 14, 15 which are positioned close to its upper and lower ends. The portion of the vertical rod 1 supported by the lower bearing member 15 is splined as at 16. The upper end of the splined portion 16 is provided with a flange 17. The upper bearing member 14 comprises inner and outer tubes 18, 19 and upper and lower two ball bearings 20 provided between the two tubes 18, 19. The inner tube 18 is slidably fitted around the vertical rod 1 with a bush 21 interposed therebetween. The outer tube 19 is secured to an unillustrated frame. The lower bearing member 15 comprises inner and outer tubes 22, 23 and upper and lower two ball bearings 24 provided between the two tubes 22, 23. The inner ring 22 is fitted around the splined portion 16 and is rotatable with the vertical rod 1. An arm 25 fixed to the lower end of the inner tube 22 has a forward end which is connected to one end of a rod 26 extending from the drive means to be described later. The outer tube 23 is fixed to a frame 27. The lower end of the vertical rod 1 extending downward from the lower bearing member 15 is fixed to a vertical rod connector 28 in alignment therewith. A horizontal rod member 29 intersects and is attached to the connector 28 by means of a bush 30. A pair of vertical parallel rods 31 have lower ends connected to the opposite ends of the rod member 29 and upper ends connected to the drive means by a frame-like connector 32.

Figure 6:
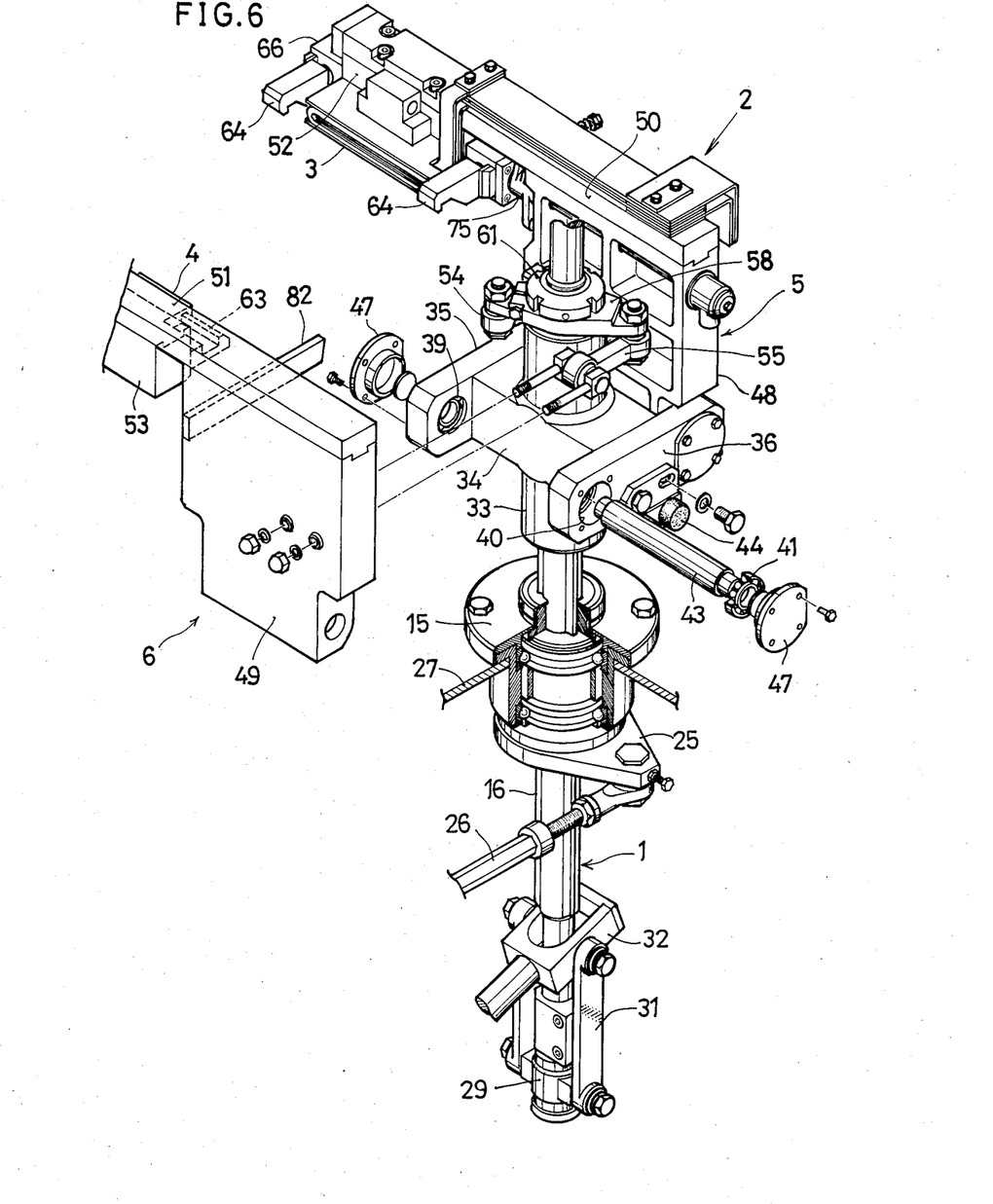
FIG. 6 is an exploded perspective view showing the portion illustrated in FIG. 3a and FIGS. 3a to 5.
Figure 7:
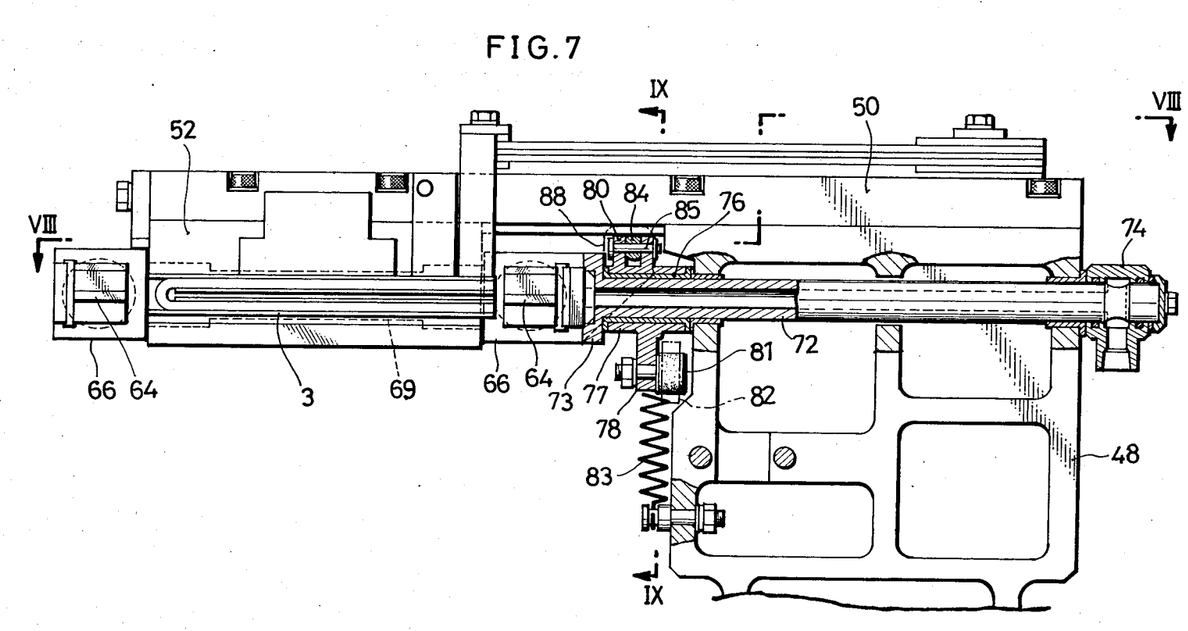
FIG. 7 is a view in section taken along the line VII—VII in FIG. 4.
Figure 8:
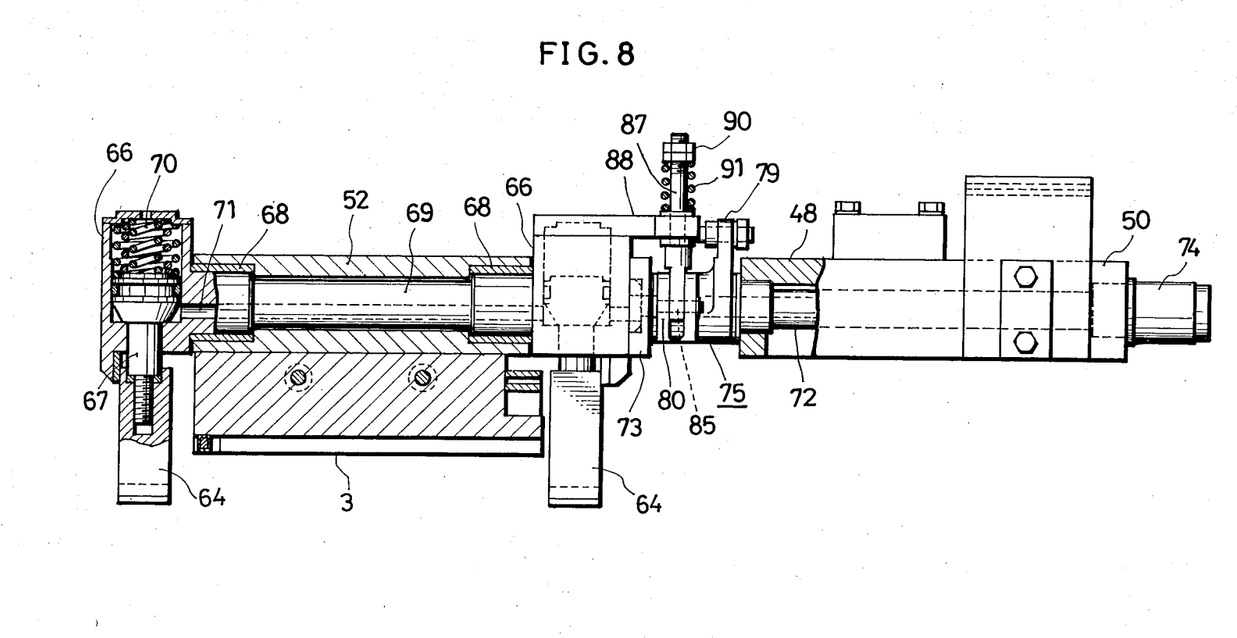
FIGS. 8 and 9 are views in section taken along the line VIII—VIII and the line IX—IX in FIG. 7, respectively.

As will be apparent from FIGS. 3a and 6, the movable frame 2 comprises a vertical tubular portion 33, and a pair of opposed walls 35, 36 made integral with the lengthwise midportion of the tubular portion 33 by a connecting portion 34. The tubular portion 33 is fitted around the vertical rod 1, with a pair of upper and lower bushes 37, 38 interposed therebetween, and bears on the flange 17. Each of the opposed walls 35,36 is formed with front and rear two holes 39, 40 spaced apart by a distance. The holes 39, 40 have fitted therein bearings 41 by which a pair of front and rear horizontal support rods 42, 43 are supported on the opposed walls 35, 36. The right wall 36 has mounted on its outer surface a pair of front and rear rollers 44 nipping a vertical guide rail 46 attached to a post 45, whereby the movable frame 2 is held against rotation (see FIG. 1). The opening of each of the holes 39, 40 has a cover 47 for retaining the bearing.

Each of the pressure arms 5, 6 comprises a flat rectangular parallelepipedal block 48 (49) fixedly mounted on the horizontal support rod 42 (43) at its lower end and having a thickness in the front-to-rear direction, a horizontal bar 50 (51) placed, at the left half of its length, on the top of the block 48 (49) and projecting rightward beyond the block, and a column block 52 (53) having an approximately square cross section and suspended from the projecting portion of the horizontal bar 50 (51). The seal bars 3, 4 are secured to the opposed sides of the column blocks 52, 53, respectively, in a projecting fashion.

By means of horizontal pins 56 and spherical bearings 57, a pair of rods 54, 56 are connected, each at its one end, to the flat blocks 48, 49 approximately at the midportion of the height of the blocks. The other ends of the rods 54, 55 are connected by vertical pins 59 and spherical bearings 60 to a horizontal rotatable member 58 at the opposite sides of the center of rotation of the member 58. The rotatable member 58 is concentrically fitted to the vertical rod 1 and keyed thereto as if pressing the tubular portion 33 of the movable frame 2 from above. A cap nut 61 fitting around the vertical rod 1 is placed over the rotatable member 58 and screwed on the rod 1, whereby the member 58 is fastened to the rod 1.

When the vertical rod 1 is moved upward or downward, the movable frame 2 and the rotatable member 58 also move therewith similarly. On the other hand, when the vertical rod 1 is rotated forward and reversely, the rotatable member 58 moves therewith in the same direction, causing the pair of rods 54, 55 connected to the member to pivotally move the two pressure arms 5, 6 between a closed position wherein the arms 5, 6 are upright and an open position in which they are inclined away from each other toward their upper ends.

Figure 9:
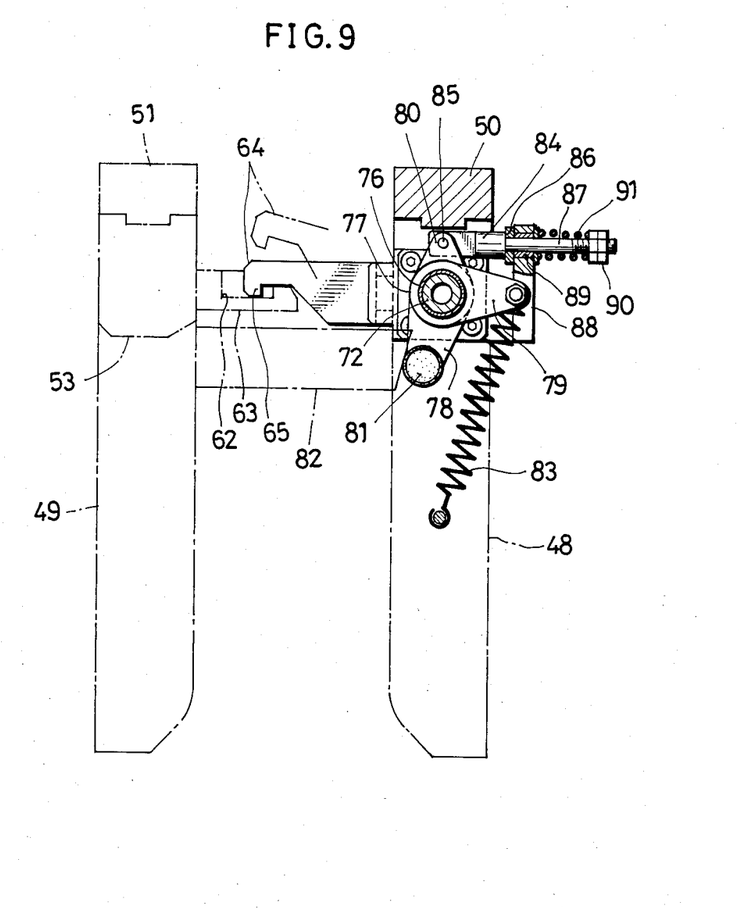
Figure 10:
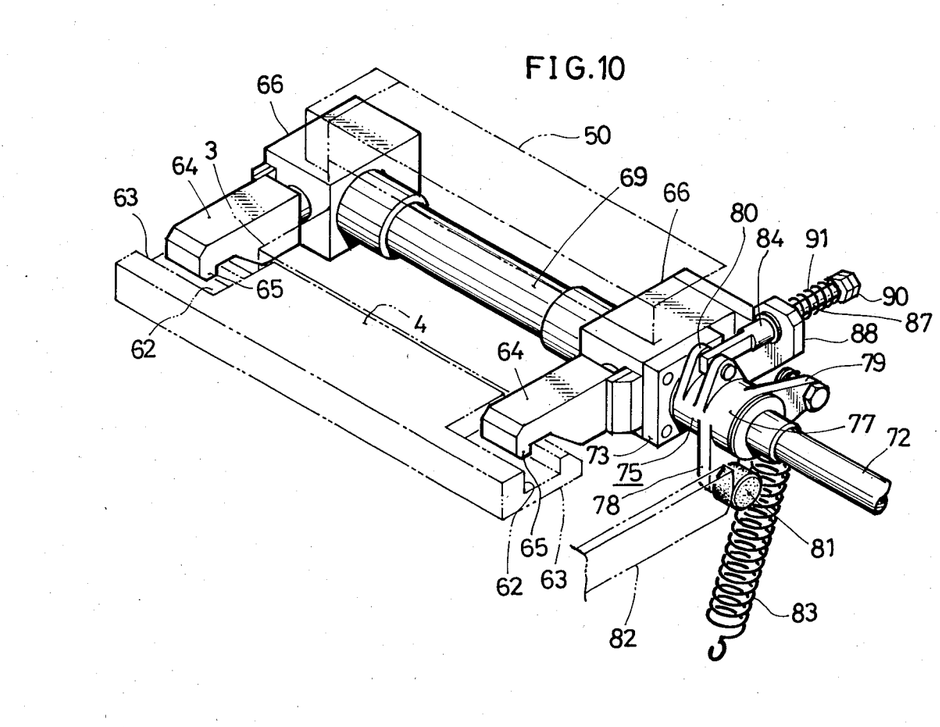
FIG. 10 is a perspective view showing the portion illustrated in FIGS. 7 to 9.
Figure 11:
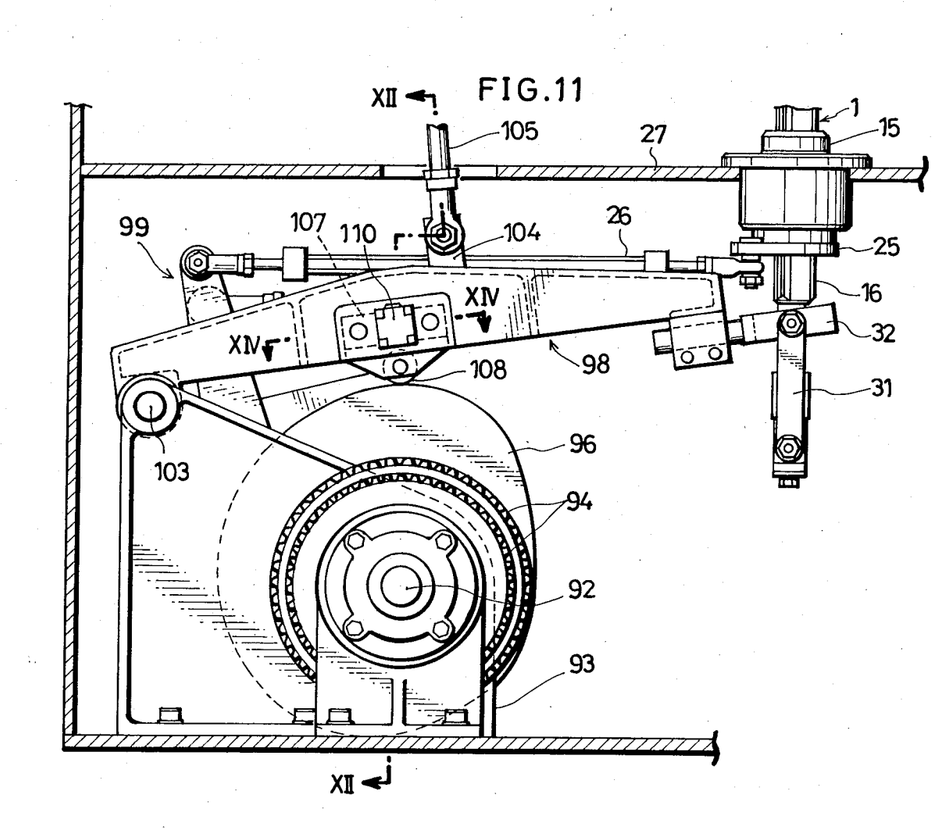
FIG. 11 is a front view showing drive means.
Figure 12:
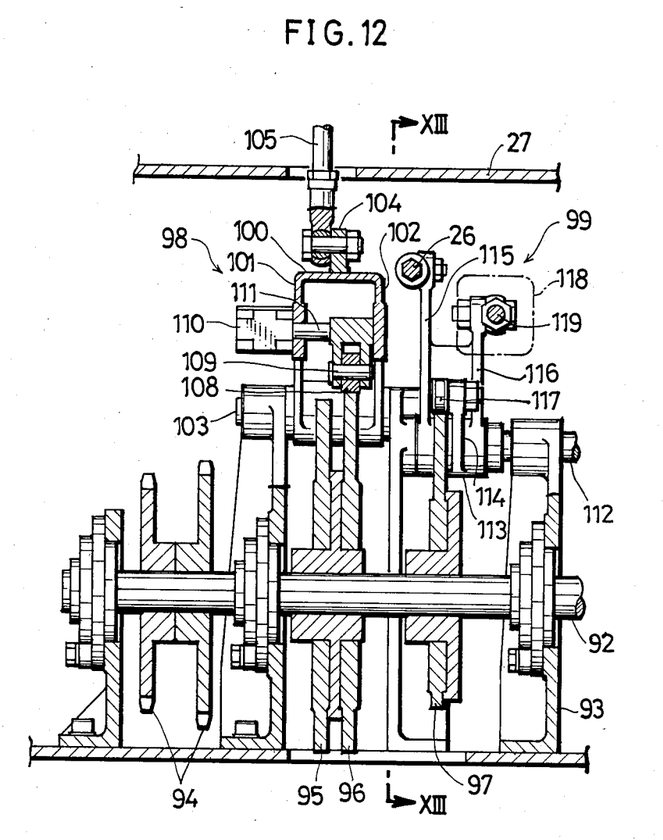
FIG. 12 is a view in section taken along the line XII—XII in FIG. 11.

The seal bar 4 on the rear pressure arm 6 is provided at its opposite sides with a pair of stationary engaging members 63 integral with the bar 4 and each having an upwardly open engaging recess 62. Each of movable engaging members 64 has a downward engaging projection 65 in engagement with the stationary engaging member (see FIGS. 2, 9 and 10).

As shown in FIGS. 7 to 10 in detail, each movable engaging member 64 is attached to the piston rod 67 of a hydraulic cylinder 66. The hydraulic cylinder 66 is integral with each end of a horizontal rotatable shaft 69 extending through the column block 52 on the front pressure arm 5 and rotatably supported by a pair of bushes 68 therein. The cylinder 66 houses a double compression coiled spring 70 for biasing the piston rod 67 outward. The two hydraulic cylinders 66 are in communication with each other through a channel 71 extending through the rotatable shaft 69 axially thereof. A working fluid supply pipe 72 has at its left end a flange 73 which is bolted to the right side face of the right hydraulic cylinder 66, whereby the pipe 72 is fixed to the rotatable shaft 69 in alignment therewith. The pipe 72 extends through and is rotatably supported by an upper portion of the flat block 48 on the front pressure arm 5. The pipe 72 has a projecting right end having a connector 74, to which an unillustrated working fluid duct is attached. A work lever 75 is mounted on the pipe 72 in contact with its flange 73. The work lever 75 has a boss 77 rotatably fitted around the pipe 72 with a bush 76 provided therebetween, a downward arm 78 extending downward from the boss 77, a forward arm 79 extending forward from the boss 77, and a bifurcated upward arm 80 extending upward from the boss 77. A roller 81 is mounted on the free end of the downward arm 78. A pusher member 82 in the form of a horizontally elongated flat plate is secured to the rear pusher arm 6 so as to be positioned behind the roller 81. The pusher member 82 has a free end slanting forwardly upward. In the late stage of the pivotal movement of the two pressure arms 5, 6 from open position to closed position, the slanting end comes into contact with the roller 81 and turns the work lever 75 counterclockwise in FIG. 9. A coiled tension spring 83 has one end attached to the free end of the forward arm 79 and the other end positioned below the work lever 75 and engaged with the left end face of the pressure arm 5. The spring 83 biases the work lever 75 clockwise in FIG. 9. A movable rod 84 is connected at its one end to the bifurcated end of the upward arm 80 by a horizontal pin 85. The movable rod 84 has a stepped portion 86 at an intermediate portion of its length and includes a small-diameter portion 87 extending from the stepped portion 86 to the other end. A bracket 88 in the form of a flat square plate for supporting the rod 84 is fixed to the front side of the right hydraulic cylinder 66 and has a right half portion projecting rightward beyond the cylinder 66. The small-diameter portion 87 of the rod 84 slidably extends through the bracket 88, with a bush 89 provided therebetween. The stepped portion 86 bears against the rear surface of the bracket 88. The other end of the rod 84 fixedly carries a spring retainer 90. A coiled compression spring 91 fitting around the small-diameter portion 87 is provided between the bracket 88 and the retainer 90.

It is now assumed that the two pressure arms 5, 6 are being pivotally moved from the open position toward the closed position. At this time, the movable engaging members 64 are in an upward position as inclined forwardly upward from the position where it is perpendicular to the front pressure arm 5, as indicated in a broken line in FIG. 9. When the pressure arms 5, 6 are brought further close to their closed position, the pusher member 82 comes into contact with the roller 81, pushing the roller forward and thereby rotating the work lever 75 counterclockwise in FIG. 9. Consequently, the movable rod 84 tends to slip off the bracket 88 rearward, but this movement is prevented by the compression spring 91, which acts to turn the bracket 88 counterclockwise about the rotary shaft 69 along with the cylinders 66. As a result, the movable engaging members 64 rotate with the cylinders 66 from the upward position to a horizontal position into engagement with the stationary engaging members 63. When a working fluid is supplied to the cylinders 66 in this state to retract the piston rods 67, the movable members 64 move forward along with the pistons 67, with the result that the opposed engaging members 63, 64 pull each other to produce a sealing pressure between the two seal bars 3, 4. When the opposed engaging members 63, 64 are brought into engagement with each other, there is a slight clearance between the two seal bars 3, 4, but this clearance is eliminated when the engaging members 63, 64 pull each other. In this state, the two pressure arms 5, 6 are slightly inclined inward from the upright position. For the movable engaging members 64 to remain in a horizontal position at this time, the movable members 64 need to be in a slightly upward position relative to the pressure arm 5. This alteration of position can be realized by the compression of the spring 91 which permits rotation of the cylinders 66 and the work lever 75 in opposite directions relative to each other.

FIGS. 11 to 14 show means for moving the vertical rod upward and downward to move the movable frame similarly and for rotating the vertical rod in forward and reverse directions to open and close the two pressure arms.

Figures 13, 14:
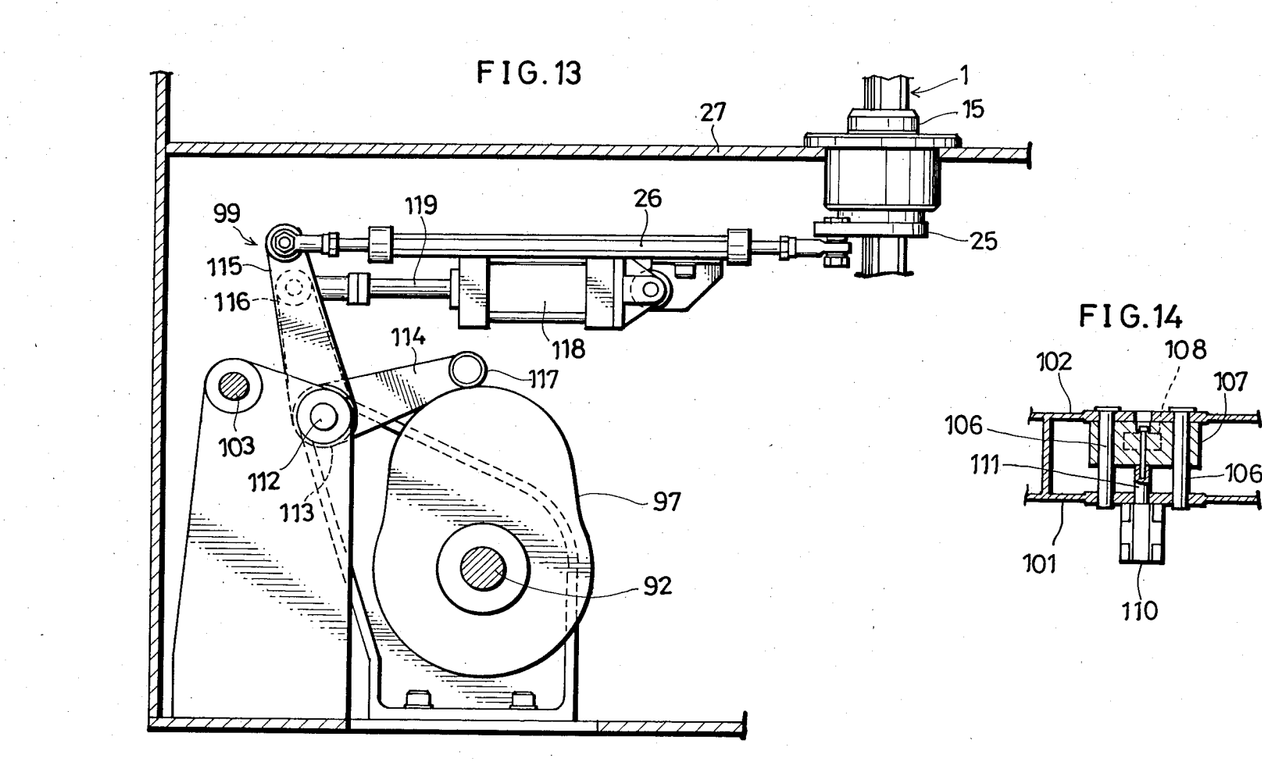
FIG. 13 is a view in section taken along the line XIII—XIII in FIG. 12.
FIG. 14 is an enlarged view in section taken along the line XIV—XIV in FIG. 11.

Below the lower end of the vertical rod 1 to the rear thereof, a horizontal cam shaft 92 extending transversely is supported by brackets 93. Fixedly mounted on the cam shaft 92 are sprockets 94, two lift plate cams 95, 96 for moving the rod 1 upward and downward, and a cam 97 for rotating the rod, these members being arranged from left to right. The two lift plate cams 95, 96 have different cam contours corresponding to the desired stroke lengths of the movable frame 2. These cams 95, 96 are provided with a common rod lifting cam follower 98, while the rod rotating plate cam 97 is provided with a rotation cam follower 99. The lift cam follower 98 is in the form of a steel channel member having an inverted U-shaped cross section and includes a top wall 100 and left and right side walls 101, 102. The cam follower 98 extends over the two lift cams 95, 96 in the front-to-rear direction and has a rear end supported by a horizontal shaft 103 on the brackets 93 and a front end to which the aforementioned frame-like connector 32 is connected adjustably in its length. A lug 104 is provided on the top wall 100 integrally therewith at a lengthwise intermediate portion thereof. A follower restraining hydraulic cylinder has a rod 105 connected to the lug 104. A pair of front and rear parallel guide rods 106 extend between and are attached to the walls 101, 102 at a lengthwise intermediate portion thereof. A movable piece 107 is supported by the guide rods 106. A downwardly projecting roller 108 is mounted on the movable piece 107 by a horizontal pin 109. A thin hydraulic cylinder 110 has a piston rod 111 which is connected to the left side face of the movable piece 107. The cylinder 110 is attached to the outer surface of the left side wall 101, and the piston rod 111 extends through the left side wall 101. The rod rotating cam follower 99 is L-shaped when seen from the front as shown in FIG. 13 and has a boss 113 supported by another horizontal shaft 112 on the brackets 93, a forward arm 114 extending forward from the boss 113 and two upward arms 115, 116 extending upward from the boss 113. The forward arm 114 carries at its free end a roller 117 bearing on the rotation cam 97. The above-mentioned rod 26, connected at its one end to the arm 25, has the other end which is connected to the upward arm 115. A follower restraining hydraulic cylinder 118 has a piston rod 119 which is connected to the other upward arm 116.

When the cam shaft 92 is rotated, one of the lift cams 95, 96 and the follower 98 convert the rotation into a reciprocating motion, which is then delivered to the vertical rod 1 to move the rod 1 upward and downward. The vertical stroke of the rod 1 corresponds to the length of one container to be formed from the tube W, so that when the length is to be altered, the thin hydraulic cylinder 110 is operated to shift the movable piece 107 and bring the roller 108 out of contact with one of the two plate cams 95, 96 into contact with the other cam.

On the other hand, the rotation cam 97 and the follower 99 convert the rotation of the cam shaft 92 to a reciprocating motion, which is delivered to the rod 26, reciprocatingly moving the rod 26 longitudinally thereof. The arm 25 connected to the rod 26 is therefore pivotally moved to move the inner tube 22 and the vertical rod 1 in the forward and reverse directions.

We claim:

1. A package container tube processing apparatus by which a vertical tube filled with contents is divided into lengths each corresponding to one container to form intermediate containers and which comprises:

a vertical rod movable upward and downward and reversibly rotatable, a movable frame attached to the vertical rod and movable therewith upward and downward while permitting the reversible rotation of the vertical rod, a pair of pressure arms supported at their lower portions by the movable frame so as to be pivotally movable about a pair of horizontal axes parallel to each other, a pair of seal bars fixed to the upper portions of the pressure arms respectively and opposed to each other, and conversion means for converting the forward-reverse rotation of the vertical rod to a pivotal motion of the two pressure arms to move the two seal bars toward or away from each other.

2. An apparatus as defined in claim 1 wherein the conversion means comprises a pair of connecting rods connected each at its one end to the pair of pressure arms respectively, and a horizontal rotable member concentrically fixed to the vertical rod and having the other ends of the connecting rods connected thereto at the opposite sides of the center of rotation thereof.

3. A package container tube processing apparatus by which a vertical tube filled with contents is divided into lengths each corresponding to one container to form intermediate containers and which comprises:

an upwardly and downwardly movable frame, a pair of pressure arms supported at their lower portions by the movable frame so as to be pivotally movable about a pair of horizontal axes parallel to each other, a pair of seal bars fixed to the upper portions of the pressure arms respectively and opposed to each other, means for pivotally moving the two pressure arms between a closed position where the two seal bars are close to each other and an open position where the two seal bars are away from each other, and press means for producing a sealing pressure between the two seal bars by forcing the two pressure arms toward each other at the closed position, the press means including a stationary engaging member having an upwardly open engaging recess and provided on one of the pressure arms so as to project into a space between the two pressure arms, a movable engaging member having a downward engaging projection engageable in the recess and a hydraulic cylinder having the movable engaging member attached to its piston rod, the hydraulic cylinder being supported by the other pressure arm and being rotatable about an axis parallel to the center of pivotal movement of said other pressure arm.

4. An apparatus as defined in claim 3 wherein a work lever having a downward arm and an upward arm is supported by said other pressure arm concentrically with the center of rotation of the hydraulic cylinder and rotatably relative to the hydraulic cylinder, and a pusher member is fixed to said one pressure arm to push the work lever in the same direction as the direction of pivotal movement of said other pressure arm upon coming into contact with the free end of the downward arm in the late stage of pivotal movement of the two pressure arms from the open position toward the closed position, the apparatus including means for transmitting to the hydraulic cylinder the rotation of the work lever pushed by the pusher member.

5. An apparatus as defined in claim 4 wherein the transmitting means comprises a movable rod connected at its one end to the free end of the upward arm of the work lever and extending in the direction of a tangent to a circle having its center at the center of rotation of the work lever, the movable rod having a stepped portion at an intermediate portion of its length and a small-diameter portion extending from the stepped portion to the other end thereof, a bracket plate secured to the hydraulic cylinder and having the small-diameter portion of the rod slidably extending therethrough at right angles therewith, with the stepped portion in bearing contact with the bracket plate, a spring retainer fixed to the other end of the movable rod, and a coiled compression spring fitting around the small-diameter portion of the rod and provided between the bracket and the retainer.

6. A package container tube processing apparatus by which a vertical tube filled with contents is divided into lengths each corresponding to one container to form intermediate containers and which comprises:
   an upwardly and downwardly movable frame,
   a pair of pressure arms supported at their lower portions by the movable frame so as to be pivotally movable about a pair of horizontal axes parallel to each other,
   a pair of seal bars fixed to the upper portions of the pressure arms respectively and opposed to each other, and
   lift means for moving the movable frame upward and downward at a stroke length which is variable so as to form intermediate containers of varying lengths to give the containers different capacities, the lift means including a plurality of plate cams fixedly arranged on a horizontal cam shaft at positions different longitudinally thereof and different in cam contour in corresponding relation to the variations in the stroke length of the movable frame, and a cam follower connected to the movable frame and common to all the plate cams, the cam follower having roller movable in parallel to the cam shaft so as to contact the contour face of each of the cams individually.

7. An apparatus as defined in claim 6 wherein a hydraulic cylinder is fixed to the cam follower and has a piston rod connected to the roller.

* * * * *